R. H. KUTSCHENREUTER.
TIRE REMOVER.
APPLICATION FILED AUG. 21, 1916.
1,242,354.
Patented Oct. 9, 1917.
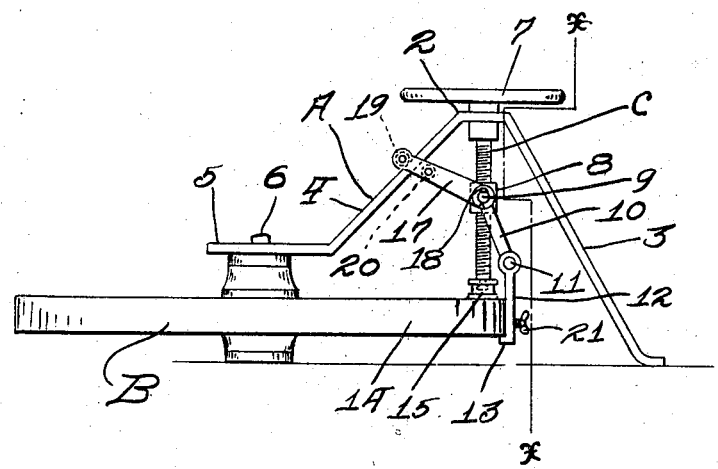
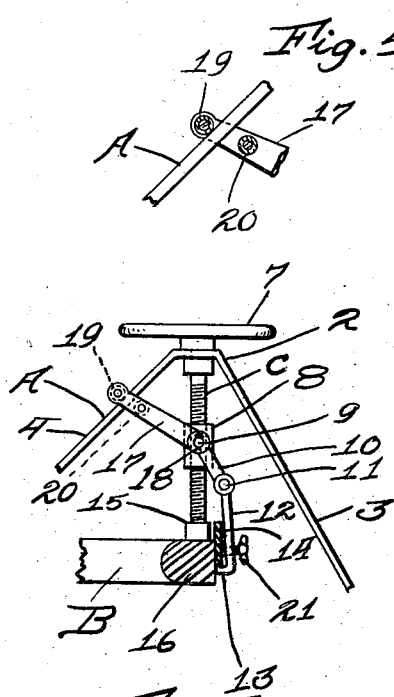
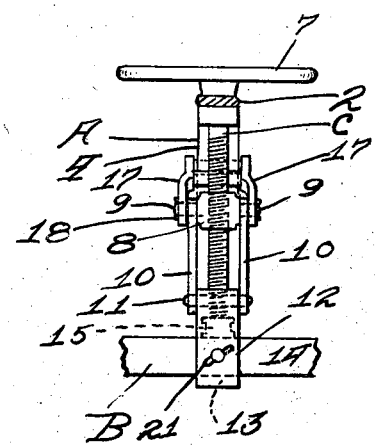
Inventor:
R. H. Kutschenreuter,
by: J S Bradbury
Attorney.

UNITED STATES PATENT OFFICE.

ROBERT H. KUTSCHENREUTER, OF LA MOURE, NORTH DAKOTA.

TIRE-REMOVER.

1,242,354. Specification of Letters Patent. Patented Oct. 9, 1917.

Application filed August 21, 1916. Serial No. 115,979.

*To all whom it may concern:*

Be it known that I, ROBERT H. KUTSCHENREUTER, a subject of Germany, residing at La Moure, in the county of La Moure and State of North Dakota, have invented a new and useful Improvement in Tire-Removers, of which the following is a specification.

This invention relates to improvements in tire removers, and has for its primary object to provide a device, which can be easily applied to a wheel and made to easily and quickly remove a tire of the metal band type.

Among further objects are simplicity of construction and greater effectiveness in use than with devices heretofore employed.

To these ends my invention comprises the features of construction and combination of parts hereinafter more particularly described and claimed.

In the drawing, Figure 1 is a side elevation of my invention shown adjusted to a wheel and in the act of removing a tire; Fig. 2 is a section on the line X—X of Fig. 1; Fig. 3 is a side elevation of a detail illustrating my invention when the tire on a wheel is partly removed, said tire and a part of the wheel being shown in section, and Fig. 4 is a sectional view of a detail.

Let A indicate a stand in the form of a bar or plate bent upwardly between its ends into a yoke 2, one side 3 of which inclines downwardly and outwardly and rests by its lower end upon the ground or floor outside of the wheel B. The other arm 4 inclines downwardly and inwardly over the hub of the wheel, the extremity of said end 4 being disposed horizontally and forming a rest 5 on said hub. A bolt or pin 6 extending through and depending from the horizontal rest 5 is inserted in the hub to engage the inner end of the stand therewith. A shaft C is swiveled at the upper portion between the inclined sides 3 and 4, of the stand and carries a hand wheel 7 above the stand by which it can be turned. The portion of the shaft below the swivel connection is engaged by a follower or trunnion 8 threaded thereon. This follower has a pair of stub shafts 9 co-axially arranged on opposite sides thereof to which are movably connected a pair of depending links 10. The lower ends of these links are pivotally attached by the bolt or pin 11 to a jaw member 12 having a shoulder 13, which is adapted to engage under the lower edge of the tire 14 to be removed from the rim 16 of the wheel B. The lower end of shaft C has secured thereto by a swivel connection a buffer 15, which is adapted to press downwardly against the rim 16 of the wheel when the jaw member 12 is being pulled upwardly by turning the shaft C. Movably secured to the stub shafts 9 by means of split keys 18 or other suitable means are a pair of stays 17 carrying upon their free outer ends a pair of antifriction rollers 19 and 20, between which the inclined side 4 of the stand is embraced. These stays minimize any tendency of the shaft C moving laterally while the follower is forced downwardly or upwardly by turning the shaft. A stop bolt 21 threaded through the jaw member 12 is adapted to limit the distance at which the jaw 13 engages below the lower edge of the tire 14. This stop prevents the jaw from projecting inwardly below the rim, while the rim is being removed from the wheel. The distribution of force while the shaft C is being turned due to the use of the stays 17 and the links 10 equalizes the strain, so that a more direct upward movement is imparted by the jaw member in removing the tire from the rim. If it were not for this equal distribution of force, the jaw member would pull upwardly at an angle, which is not as effective in removing a tire from a wheel and tends to disengage the jaw from the tire. The parts of the stand A are so proportioned that when the device is applied to a wheel for use, the wheel is supported normally in horizontal position, and the pull on the tire is vertical as shown in Fig. 1. This is distinctly advantageous.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:

1. A tire remover, comprising, in combination, a stand having a pair of downwardly spreading arms one of said arms being adapted to be coupled to a wheel and the other adapted to rest upon a support independent of said wheel, a hand operable screw swiveled in substantially upright position on said stand having its lower end adapted to be impressed against the rim of said wheel, a follower threaded on said screw and a jaw member linked to said follower and adapted to engage a tire on said wheel, said follower being movably linked to said wheel coupled arm to assist in supporting said screw in substantially upright position.

2. A tire remover, comprising, in combination, a stand having one end extending inwardly and adapted to engage the hub of a horizontally supported wheel and its other end extending outwardly and adapted to rest upon the ground outside of the periphery of said wheel, an upright screw revolubly supported on said stand having its lower end adapted to press against the rim of said wheel, a jaw adapted to engage the tire on said wheel, a follower threaded on said screw, a link movably connecting said follower with said jaw and a stay movably disposed between said follower and said inwardly extending arm of said frame to assist in supporting the screw in upright position while the jaw is being raised to remove said tire from the wheel.

In testimony whereof, I have signed my name to this specification.

ROBERT H. KUTSCHENREUTER.

Copies of this patent may be obtained for five cents each, by addressing the "Commissioner of Patents, Washington, D. C."